United States Patent
Yu et al.

(10) Patent No.: US 8,408,508 B2
(45) Date of Patent: *Apr. 2, 2013

(54) SUPPORT STRUCTURE FOR DISPLAY DEVICE AND DISPLAY DEVICE USING SAME

(75) Inventors: Hai-Yang Yu, Shenzhen (CN);
Hong-Wei Zhu, Shenzhen (CN);
Er-Zheng Zhao, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/281,415

(22) Filed: Oct. 25, 2011

(65) Prior Publication Data

US 2012/0037784 A1 Feb. 16, 2012

Related U.S. Application Data

(62) Division of application No. 12/406,091, filed on Mar. 17, 2009, now Pat. No. 8,056,876.

(30) Foreign Application Priority Data

Oct. 21, 2008 (CN) .......................... 2008 1 0305067

(51) Int. Cl.
*A47B 96/06* (2006.01)

(52) U.S. Cl. ............... 248/231.71; 248/917; 361/679.21

(58) Field of Classification Search ................. 248/917, 248/918, 919, 921, 923, 230.6, 230.7, 230.9, 248/231.71; 340/432; 361/681, 679.01, 361/679.02, 679.03, 679.04, 679.05, 679.06, 361/679.07, 679.21, 679.22, 679.23, 679.24
See application file for complete search history.

(56) References Cited

U.S. PATENT DOCUMENTS

| 5,595,441 | A | * | 1/1997 | McGee | 362/473 |
| 6,220,557 | B1 | | 4/2001 | Ziaylek et al. | |
| 6,305,241 | B1 | * | 10/2001 | Masui et al. | 74/551.8 |
| 7,261,261 | B2 | * | 8/2007 | Ligertwood | 248/129 |
| 8,056,876 | B2 | * | 11/2011 | Yu et al. | 248/316.5 |
| 8,226,062 | B2 | * | 7/2012 | Yu et al. | 248/316.5 |
| 2003/0226946 | A1 | | 12/2003 | Liao | |

* cited by examiner

*Primary Examiner* — Alfred J Wujciak
(74) *Attorney, Agent, or Firm* — Altis Law Group, Inc.

(57) ABSTRACT

A support structure for supporting a display panel includes a support and a clamp. The support is rotatably coupled to the display panel. The clamp includes two clamping arms rotatably coupled to the support, a bolt and an adjusting nut. A slot is defined in each clamping arm. The bolt is extended through each slot and engaged with the adjusting nut. Therefore a distance between two distal ends of two clamping arms can be adjusted by screwing and unscrewing the adjusting nut along the bolt. A display device using the support structure is also provided.

6 Claims, 5 Drawing Sheets

SUPPORT STRUCTURE FOR DISPLAY DEVICE AND DISPLAY DEVICE USING SAME

CROSS-REFERENCE TO RELATED APPLICATION

The present application is a divisional application of and claims priority to U.S. patent application Ser. No. 12/406,091, entitled "SUPPORT STRUCTURE FOR DISPLAY DEVICE AND DISPLAY DEVICE USING SAME" and filed Mar. 17, 2009, which is incorporated herein by reference.

BACKGROUND

1. Technical Field

The present disclosure relates to support structures and particularly, to a support structure for a display device and a display device using the support structure.

2. Description of the Related Art

Generally, displays, such as a computer monitor, are supported by a stand that offers limited range of movement on support surfaces. Most stands are supported on a flat horizontal surface, such as a desk surface. Orientation or the range of movement of the display devices may be adjusted to meet the viewer's preferences. However, supporting the display device on a non-horizontal surface may not be possible.

Therefore, what is needed is to provide a support structure for a display device and a display device using the support structure, in which the above problem is eliminated or at least alleviated.

DETAILED DESCRIPTION OF THE EMBODIMENTS

Figure 1:
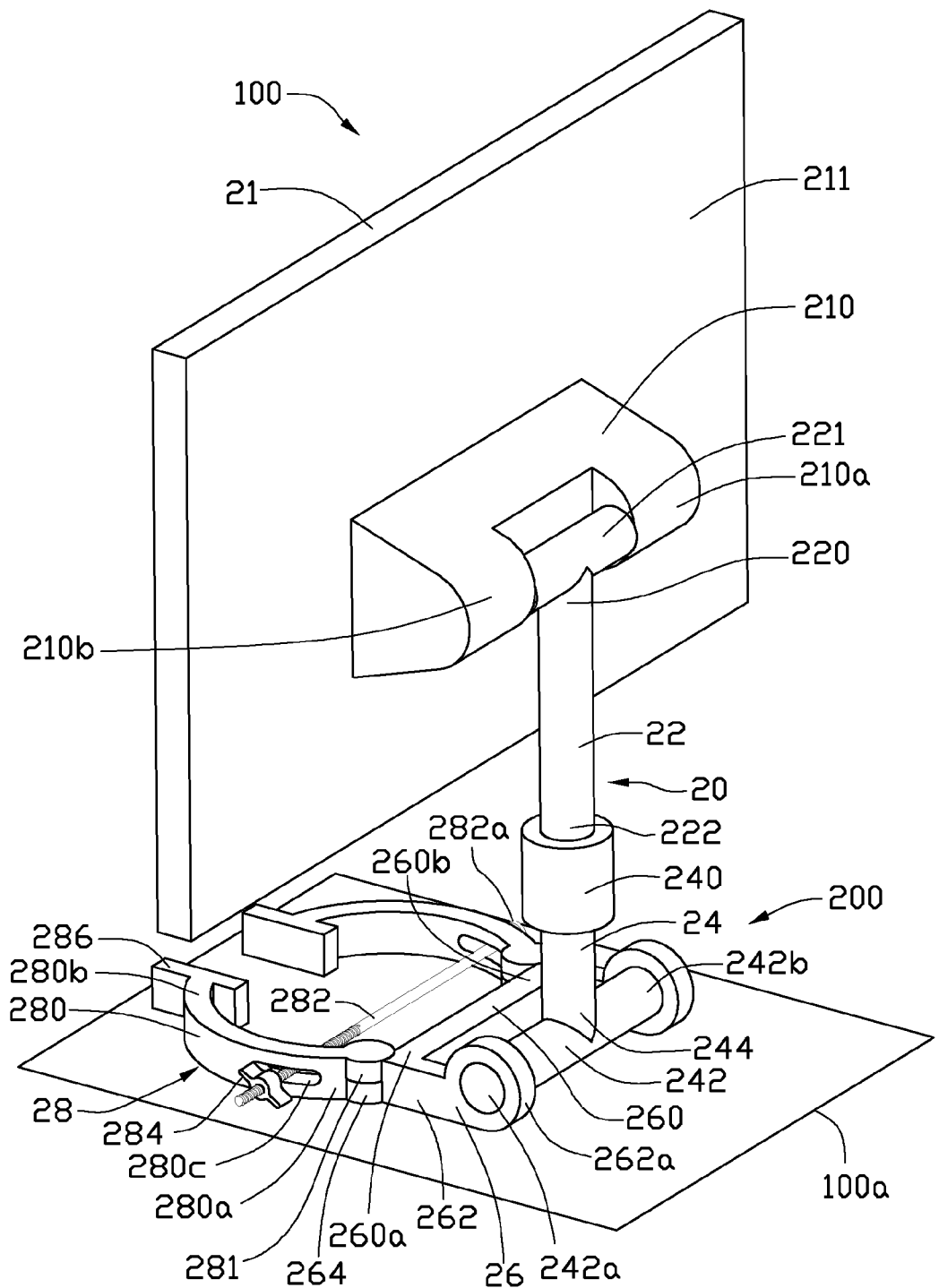
FIG. 1 is a schematic isometric view of a display device including a support structure and a display panel, according to an exemplary embodiment, showing the display panel supported by the support structure in a first state.
Figure 2:
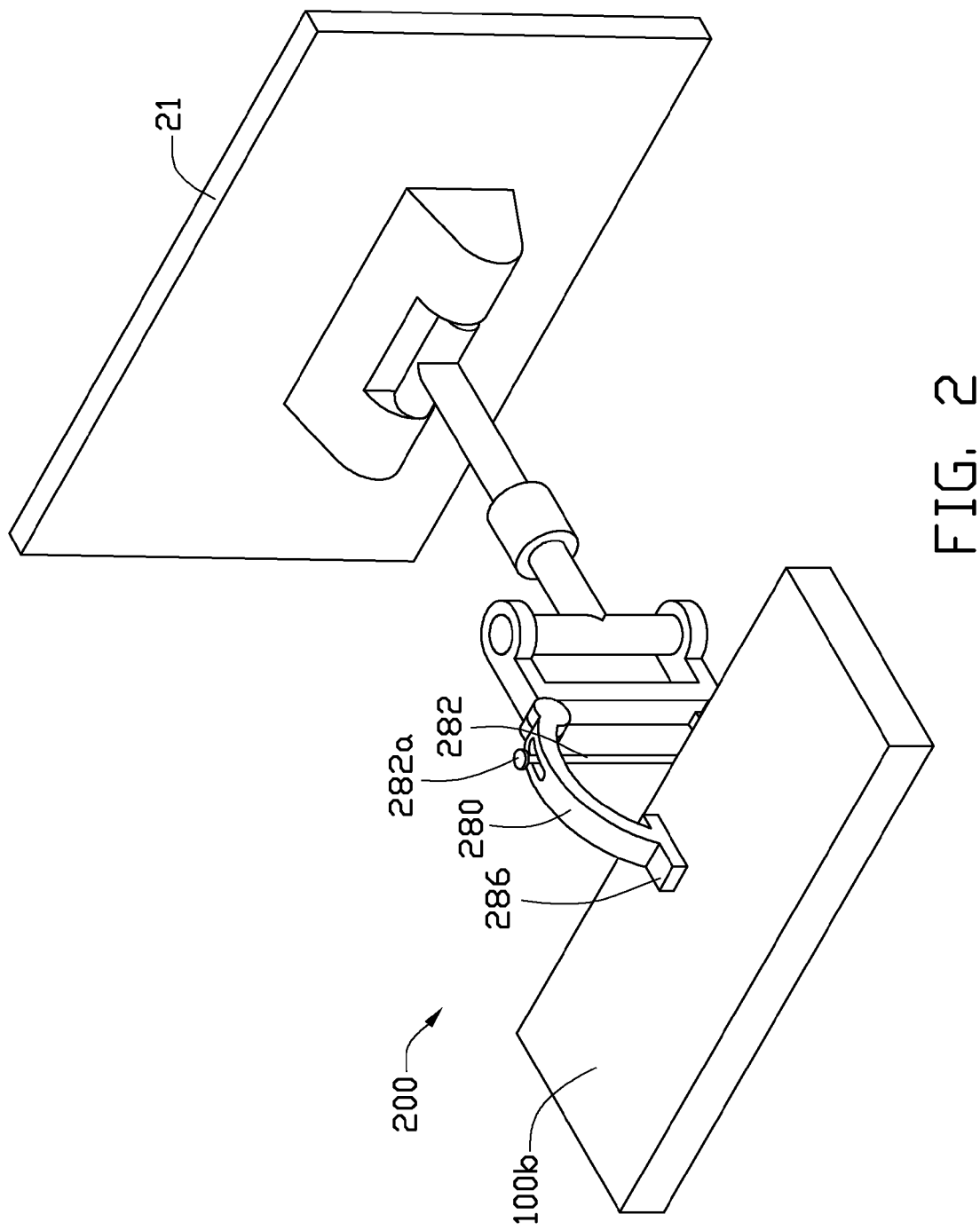
FIG. 2 is similar to FIG. 1, but showing the display panel supported by the support structure in a second state.

Referring to FIGS. 1 and 2, a display device 100 according to an exemplary embodiment includes a display panel 21 and a support structure 200 for supporting the display panel 21. The support structure 200 includes a support 20 and a clamp 28. The display panel 21 may be, but is not limited to, a liquid crystal display panel, a light emitting diode display panel, an organic light emitting diode display panel or a plasma display panel. The display panel 21 includes a fixed portion 210 at a rear 211 of the display panel 21. The fixed portion 210 includes two connecting blocks 210a, 210b, spaced from each other. Two holes (not shown) are defined in the connecting blocks 210a, 210b respectively.

The support 20 includes a first connector 22, a supporting portion 24 and a second connector 26. The first connector 22 includes a rotating shaft 221 at one end 220 of the first connector 22. The rotating shaft 221 is rotatably coupled to the two connecting blocks 210a, 210b through the holes. It is to be understood that friction between the rotating shaft 221 and the two connecting blocks 210a, 210b is stronger than the force of gravity acting on the display panel 21 but weak enough to be manually repositioned. Therefore, the display panel 21 may be manually rotated around the rotating shaft 221 to any position along its arc of rotation where it will remain until adjusted again. Another end 222 of the first connector 22 is rotatably coupled to the supporting portion 24.

The supporting portion 24 is approximately T-shaped and includes a sleeve 240, a lateral arm 242, and a connecting rod 244. The sleeve 240 is shaped and sized for rotatably receiving the end 222 of the first connector 22. The connecting rod 244 fixedly connects the sleeve 240 to the lateral arm 242. The lateral arm 242 includes two opposite ends 242a, 242b.

The second connector 26 includes an elongated body 260 approximately parallel to the lateral arm 242 and two connecting arms 262 extending from two opposite ends 260a, 260b of the elongated body 260. Each connecting arm 262 includes a ring portion 262a configured for rotatably receiving the ends 242a, 242b of the lateral arm 242. Two first engaging blocks 264 extend from the elongated body 260 in a direction opposite to that of the connecting arms 262. It is to be understood that friction between the lateral arm 242 and the ring portions 262a is stronger than the force of gravity acting on the display panel 21 plus the first connector 22 but weak enough to allow for manual adjustment. Therefore, the display panel 21 together with the first connector 22 may be manually rotated around the ring portion 262a to any position along its arc of rotation where it will remain until adjusted again.

The clamp 28 includes two clamping arms 280, a bolt 282 and an adjusting nut 284. Each clamping arm 280 is arc-shaped and includes a second engaging block 281 at one end 280a of the clamping arm 280 and a plane clamping block 286 at an opposite distal end 280b of the clamping arm 280. The second engaging blocks 281 of the clamp 28 are configured for rotatably engaging with the first engaging blocks 264 of the second connector 26. A slot 280c is defined in each clamping arm 280 between the second engaging block 281 and the plane clamping block 286. The bolt 282 is extended through the two slots 280c and is engaged with the adjusting nut 284. A diameter of a cap 282a of the bolt 282 and a radial length of the adjusting nut 284 are greater than the width of each slot 280c. Therefore, when the adjusting nut 284 is screwed or unscrewed along the bolt 282, i.e., toward and away from the cap 282a of the bolt 282 along the bolt 282, the distance between the two plane clamping blocks 286 can be adjusted to fit different-shaped objects where the display device 100 is attached.

When the display device 100 is required to be placed on a horizontal or plane surface 100a, such as a desk surface 100a, the second connector 26 together with the clamp 28 is adjusted by their rotation along the lateral arm 242 to cooperatively form a supporting surface suitable for placement on the desk surface 100a, as shown in FIG. 1. When the display device 100 is required to be attached to a plate-shaped object 100b, the adjusting nut 284 is unscrewed to open the clamp 28, the plate-shaped object 100b is then sandwiched between the two plane clamping blocks 286 and the adjusting nut 284 is screwed to lock the clamp 28, thereby the two plane clamping blocks 286 fixedly attached to the plate-shaped object 100b, as shown in FIG. 2. To further adjust a viewing angle of the display panel 21, manual rotation of the display panel 21, the first connector 22, and the lateral arm 242 may be executed.

In summary, the support structure 200 can easily be adjusted to fit different-shaped objects.

Figure 3:
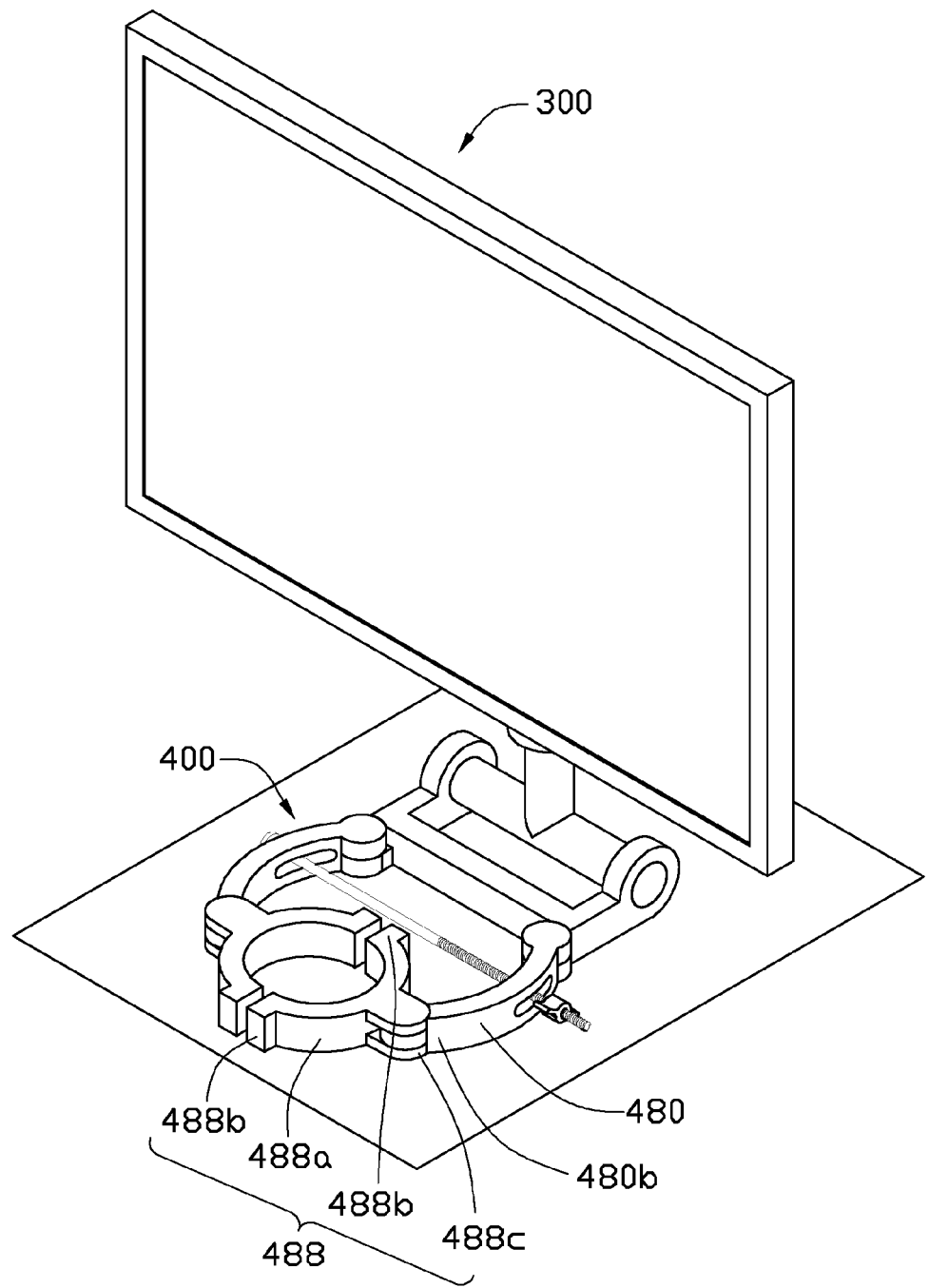
FIG. 3 is a schematic isometric view of a display device including a support structure and a display panel, according to another exemplary embodiment, showing the display panel supported by the support structure in a first state.

Referring to FIG. 3, a display device 300 including a support structure 400 according to another exemplary embodiment is shown. The difference between the support structure 400 of this embodiment and the support structure 200 is that the clamping blocks 488 of the support structure 400 are different.

Figure 4:
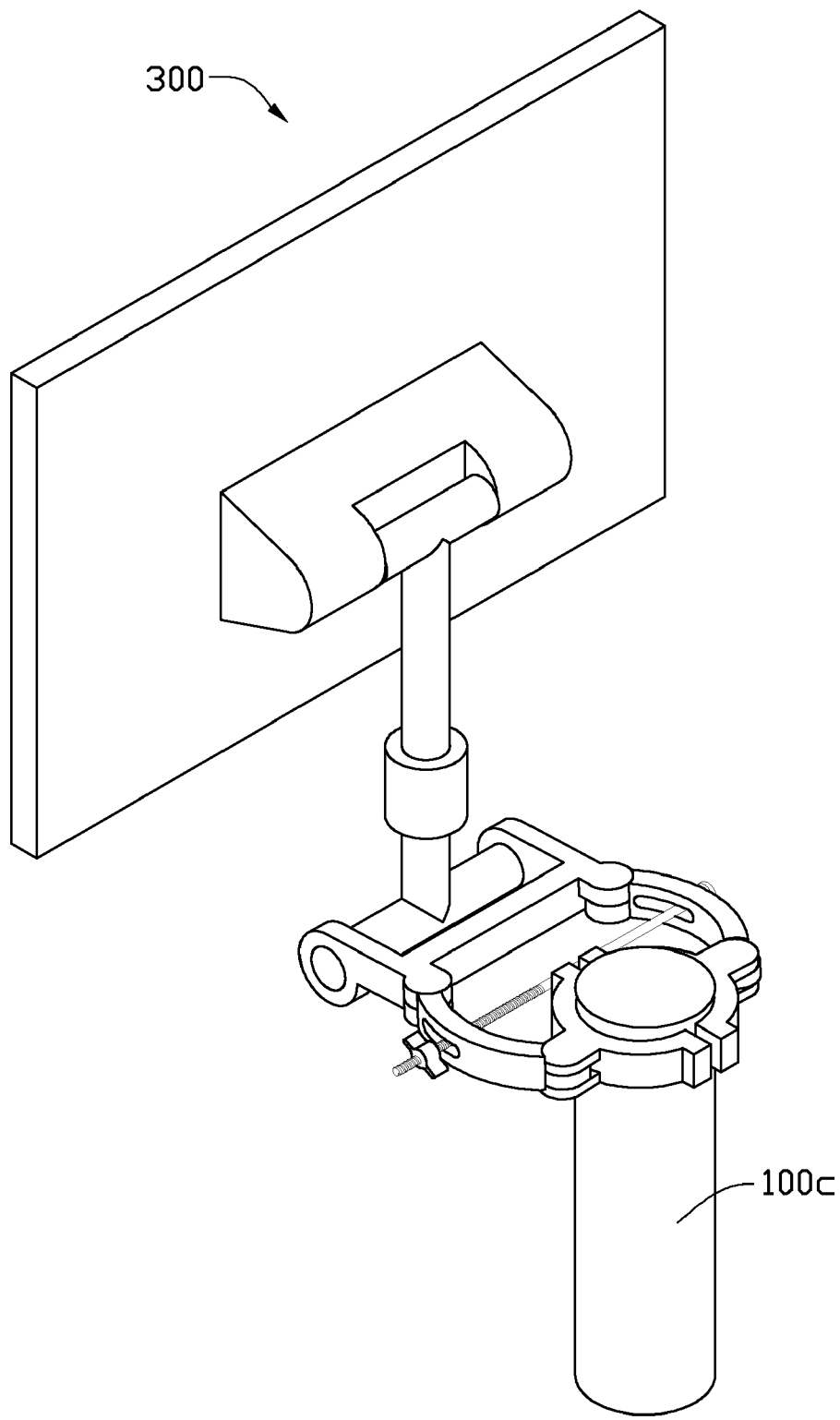
FIG. 4 is similar to FIG. 3, but showing the display panel supported by the support structure in a second state.

Each clamping block 488 of the support structure 400 includes an arc-shaped portion 488a, two plane portions 488b, and a connecting portion 488c. The two plane portions 488b extend from two distal ends of the arc-shaped portion 488a respectively. The connecting portion 488c protrudes outwards from the approximate middle of the arc-shaped portion 488a and between the two plane portions 488b. The connecting portion 488c is rotatably coupled at the distal end 480b of the clamping arm 480, thereby the clamping block 488 is rotatably coupled to the clamping arm 480. The support structure 400 of this embodiment is further suitable for attaching the display device 300 to a circular object 100c, as shown in FIG. 4.

Figure 5:
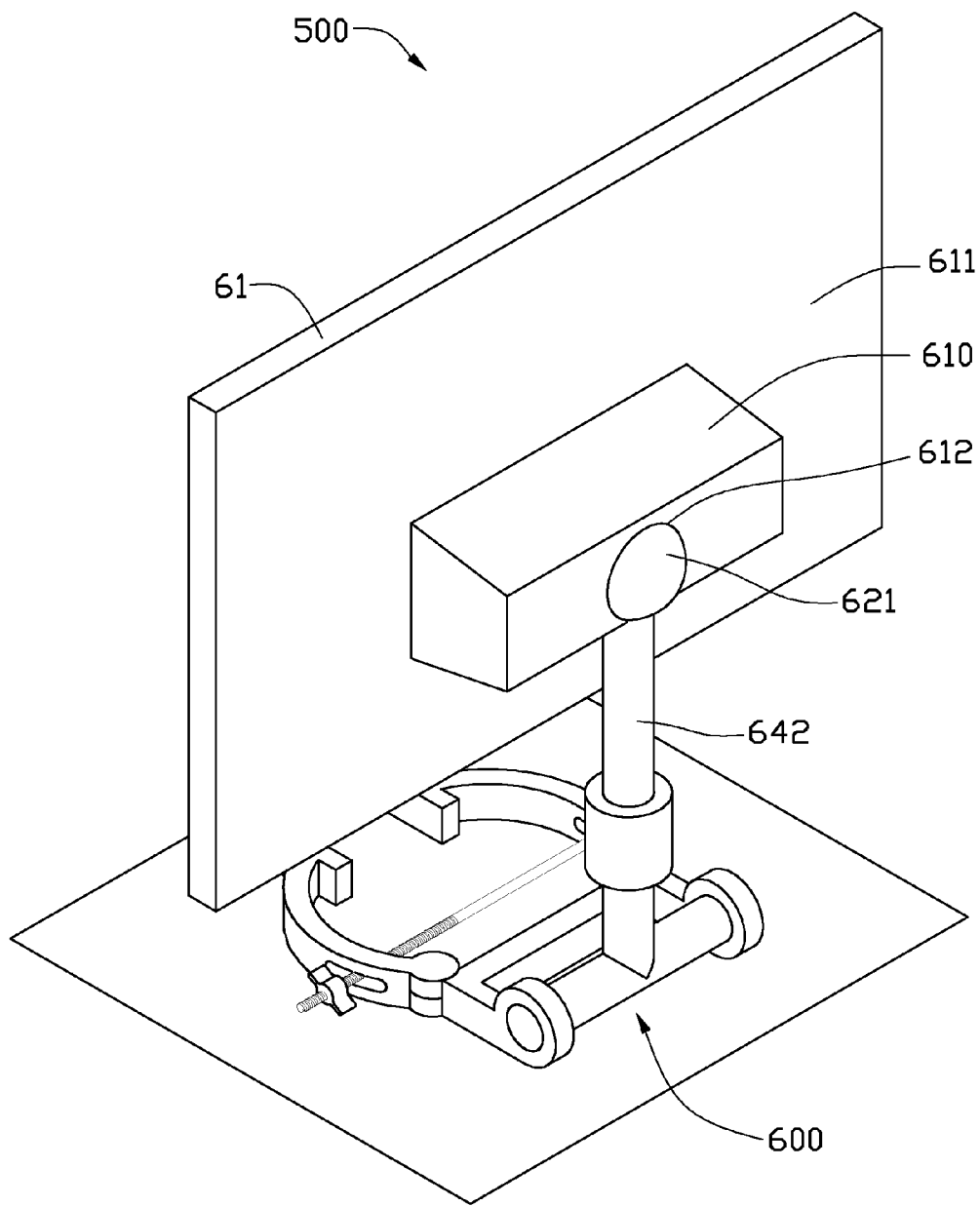
FIG. 5 is a schematic isometric view of a display device including a support structure and a display panel, according to a further exemplary embodiment.

Referring to FIG. 5 together with FIG. 1, a display device 500 including a support structure 600 and a display panel 61 according to a further exemplary embodiment is shown. The display panel 61 includes a fixed portion 610 at the rear 611 of the display panel 61. A receiving cavity 612 is defined in the fixed portion 610. The difference between the support structure 600 of this embodiment and the support structure 200 is that the first connector 642 of the support structure 600 includes a ball-shaped portion 621 instead of the rotating shaft 221. The ball-shaped portion 621 is shaped and sized for being rotatably received in the receiving cavity 612. Advantages of this embodiment are similar to those of the first-described embodiment.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A display device comprising:
   a display panel, wherein the display panel is selected from the group consisting of a light emitting diode display panel, an organic light emitting diode display panel and a plasma display panel; and
   a support structure comprising:
      a support rotatably coupled to the display panel; and
      a clamp comprising two clamping arms, a bolt and an adjusting nut, each of the two clamping arms comprising an end rotatably connected to the support and an opposite end that comprises a clamping block, a slot being defined in each clamping arm, the bolt extending through each slot and engaged with the adjusting nut, such that a distance between two distal ends of the two clamping arms is adjustable by selectively screwing or unscrewing the adjusting nut along the bolt, allowing the clamping blocks of the two clamping arms to press against opposite sides of a plate-shaped object, thereby attaching the display panel to the plate-shaped object.

2. The display device as claimed in claim 1, wherein the display panel comprises a fixed portion at a rear thereof, the fixed portion including two connecting blocks spaced from each other, the support rotatably coupled to the two connecting blocks.

3. The display device as claimed in claim 2, wherein the support comprises a first connector, a supporting portion and a second connector, the first connector comprising a ball-shaped portion rotatably received in the receiving cavity at one end of the first connector, the supporting portion comprises a sleeve rotatably receiving another end of the first connector, a lateral arm and a connecting rod fixedly connecting the sleeve to the lateral arm, the second connector is rotatably coupled to the lateral arm and to the two clamping arms.

4. The display device as claimed in claim 3, wherein the second connector comprises an elongated body approximately parallel to the lateral arm, and two connecting arms extending in a same direction from two opposite ends of the elongated body, each connecting arm comprising a ring portion rotatably coupled to one of two opposite ends of the lateral arm, two first engaging blocks extending from the two opposite ends of the elongated body in a direction opposite to that of the connecting arms, each clamping arm comprising a second engaging block at one end thereof for engaging with a corresponding first engaging block.

5. The display device as claimed in claim 4, wherein each clamping arm further comprises a clamping block at an opposite end thereof 6. The display device as claimed in claim 5, wherein the clamping block is plane-shaped.

* * * * *